United States Patent [19]
Hendrickson

[11] Patent Number: 5,242,176
[45] Date of Patent: Sep. 7, 1993

[54] RESCUE SLED FOR USE IN THE SNOW

[76] Inventor: J. Dean Hendrickson, 34050 732 Ave., Kimball, Minn. 55353

[21] Appl. No.: 938,999

[22] Filed: Sep. 2, 1992

[51] Int. Cl.$^5$ ............................................. B62B 17/04
[52] U.S. Cl. ......................................... 280/25; 240/26
[58] Field of Search ....................... 280/24, 25, 26, 28, 280/28.14, 28.15, 701, 698, 690; 180/219, 182

[56] References Cited

U.S. PATENT DOCUMENTS

| | | | |
|---|---|---|---|
| 2,703,709 | 3/1955 | Wagner | 267/254 |
| 2,896,940 | 7/1959 | Lightbourn | 267/254 |
| 3,618,812 | 10/1971 | Hetteen | 280/26 |
| 3,724,578 | 4/1973 | Erickson | 280/26 |
| 3,746,357 | 7/1973 | Haskins | 280/24 |
| 3,809,172 | 5/1974 | Hendrickson et al. | 280/26 |
| 4,389,066 | 6/1983 | Weir et al. | 280/24 |

Primary Examiner—Richard M. Camby
Attorney, Agent, or Firm—Kinney & Lange

[57] ABSTRACT

A rescue sled adapted to be pulled by a snowmobile including a patient/material carrying section and an attendant support section. The patient material carrying section is configured to carry an injured person to be transported by the rescue sled from a remote, snow covered accident/crash sight to a location where the injured person can receive medical care. The attendant support section is designed to carry medical personnel who can attend to the injured person during transport. The rescue sled is supported for travel over rugged, snow covered terrain by a rear suspension assembly and a front suspension/steering assembly. The rear suspension assembly and front suspension/steering assembly both include left and right independent suspension units that provide the rescue sled with a smooth ride even at high towing speeds.

12 Claims, 4 Drawing Sheets

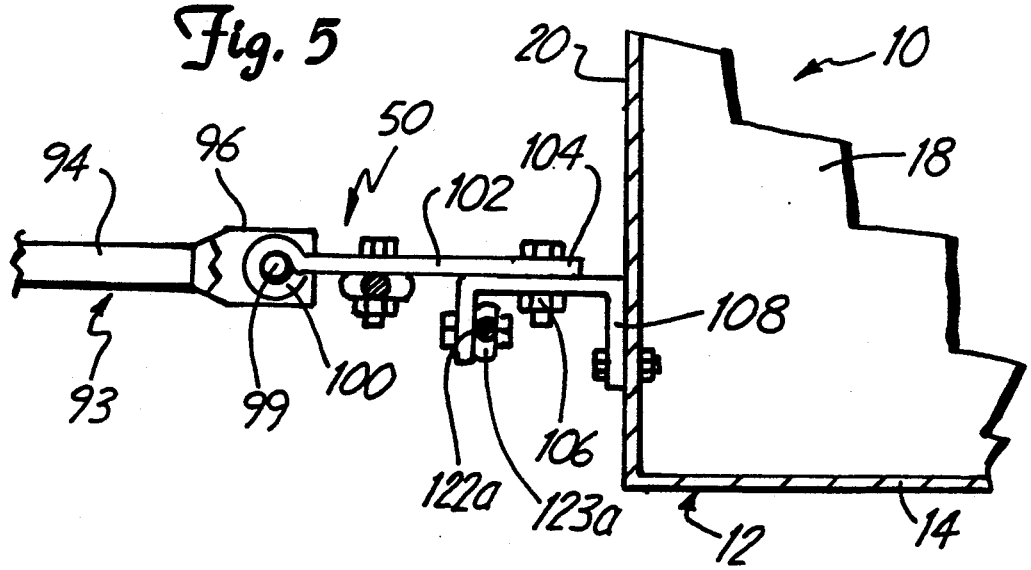
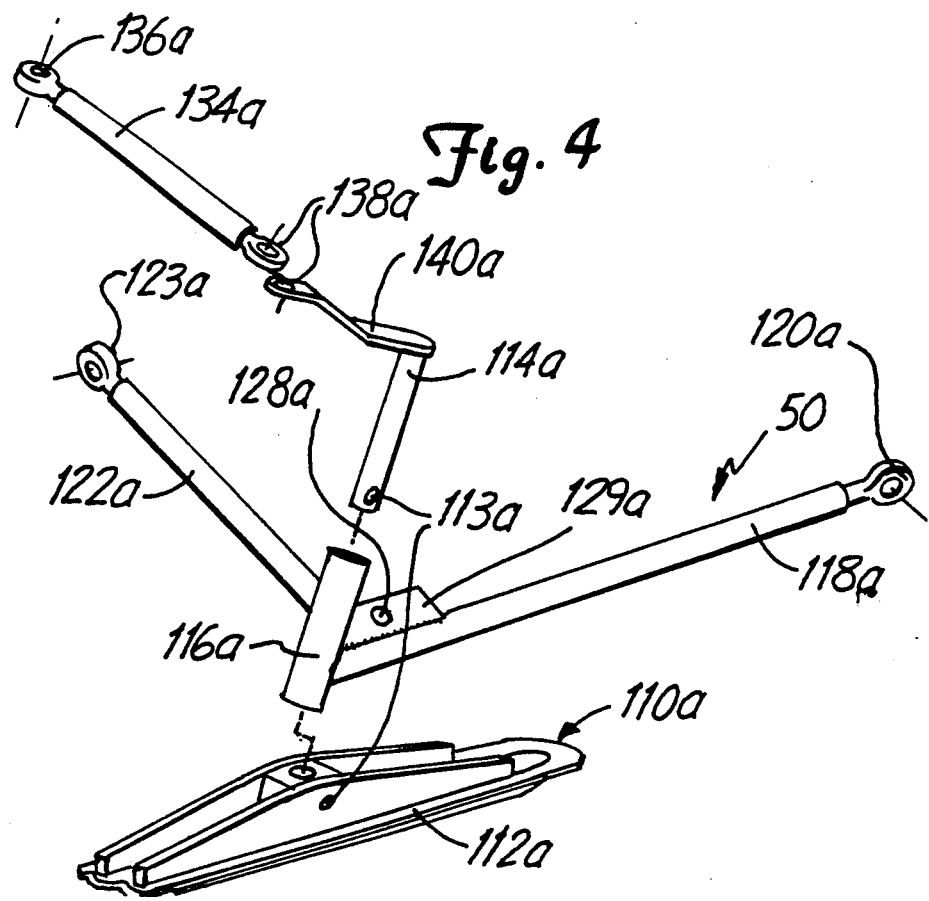

RESCUE SLED FOR USE IN THE SNOW

BACKGROUND OF THE INVENTION

The present invention relates generally to trailered vehicles. In particular, the present invention is a rescue sled adapted to be pulled by a traction vehicle, such as a snowmobile, for the purpose of transport of a patient and/or materials when conventional methods of transportation cannot be used due to climatic conditions or terrain limited accessibility.

Rescue sleds adapted to be pulled by a snowmobile over snow covered terrain are generally known. U.S. Pat. No. 3,746,357 to Haskins discloses one such ambulance sled. The ambulance sled includes an enclosed body shell having a rear end door to facilitate insertion and removal of a stretcher. The body shell is supported by a non-steerable rear ski unit. The rear ski unit includes a pair of skis attached by way of joints to the front and rear ends of leaf springs. The leaf springs are in turn pivotally attached to a cross-frame of the body shell for limited movement about a horizontal axis.

The ambulance sled further includes a steerable front ski unit. The front ski unit has a single ski which is attached by way of joints to a leaf spring. The leaf spring is in turn pivotally secured to the body shell through an attaching frame. A tow bar assembly, adapted to be secured to a snowmobile, is pivotally attached to the front ski unit. The tow bar assembly and front ski unit can swing forty-five degrees to either side of front and center. Because front and rear ski units of the ambulance sled of Haskins use leaf spring suspension assemblies, the ride of the ambulance sled can be somewhat rough, particularly at high speeds over rugged terrain. This rough ride, at the least, may be uncomfortable for the patient transported within the ambulance sled of Haskins, and at the most, could be traumatic.

The U.S. Pat. No. 4,389,066 to Weir et al. discloses another rescue sleigh that is adapted to be towed behind a snowmobile. The rescue sleigh includes a towbar section, a patient carrying section and an attendant's section. The patient carrying section is enclosed by a pivotally mounted canopy. Ski assemblies are secured via pivotal and movable bolt assemblies to frame members of the of the rescue sleigh. Each ski assembly includes a leaf spring means and a ski. As with the above described Haskins patent, the leaf spring suspension means of Weir et al. may cause the ride of the rescue sleigh to be somewhat rough at high speed over rugged terrain.

There is a need for improved rescue sleds. Specifically, there is a need for a rescue sled that can traverse rugged snow covered terrain at high speeds while providing a smooth and comfortable ride for a patient transported on the sled. In addition, there is a need for a rescue sled of efficient design and sturdy construction that can be towed behind a traction vehicle, such as a snowmobile, with minimal adverse affect to the rideability and steerability of the vehicle.

SUMMARY OF THE INVENTION

The present invention is a rescue sled that is adapted to be pulled by a traction vehicle, such as a snowmobile, across rugged snow covered terrain. The rescue sled includes a main support frame that defines a patient/material carrying section and an auxiliary support frame that defines an attendant support section. The patient material carrying section is configured to carry an injured person to be transported by the rescue sled from a remote, snow covered accident/crash sight to a location where the injured person can receive medical care or be further transported by conventional means to a medical facility. The attendant support section is designed to carry medical personnel who can attend to the injured person during transport. The rescue sled is supported for travel over rugged, snow covered terrain by a rear suspension assembly and a front suspension/steering assembly.

The rear suspension assembly includes left and right independent suspension units. Each suspension unit includes a support member, a ski member mounted to the support member, a spring coil over shock absorber unit and first and second suspension arms. Each of the first and second suspension arms has a first end pivotally connected to the main support frame and a second end pivotally connected to the support member. The first and second suspension arms extend substantially parallel to a longitudinal centerline of the rescue sled. A first end of the spring coil over shock absorber unit is pivotally coupled to the first suspension arm and a second end of the shock absorber unit is pivotally coupled to the second suspension arm.

The front suspension/steering assembly also includes left and right independent suspension units. Each suspension unit essentially includes a strut element, a steerable ski member and a spring coil over shock absorber unit. The suspension/steering assembly further includes a steering mechanism that essentially includes a tow bar and steering rods for turning the steerable ski members upon movement of the tow bar.

This rescue sled is relatively uncomplicated. The front and rear, left and right independent suspension units, that incorporate spring coil over shock absorber units, are ideally suited to traverse rugged snow covered terrain. Mounting the front and rear suspension units flush with side walls of the main support frame, lowers the center of gravity of the sled, allowing the sled to be pulled at high speeds (i.e., in the 50 mph to 75 mph range) while providing a smooth, controllable and comfortable ride for a patient. In addition, the flush mounting arrangement of the suspension units allows the rear ski members to be closer to the front ski members, which greatly reduces the bridging effect (i.e., the bottom of the sled getting hung up on moguls and bumps) normally associated with rescue sleds. Moreover, the steering mechanism allows the front skis, and thereby the rescue sled, to track with the snowmobile in turns with minimal adverse affect to the rideability and steerability of the snowmobile.

BRIEF DESCRIPTION OF THE DRAWINGS

FIG. 4 is an exploded perspective view of a left front steering unit of the rescue sled shown in FIG. 1.

FIG. 5 is a sectional view taken along line 5—5 in FIG. 2 showing details of a steering system of the rescue sled in accordance with the present invention.

DETAILED DESCRIPTION OF THE PREFERRED EMBODIMENTS

Figure 1:
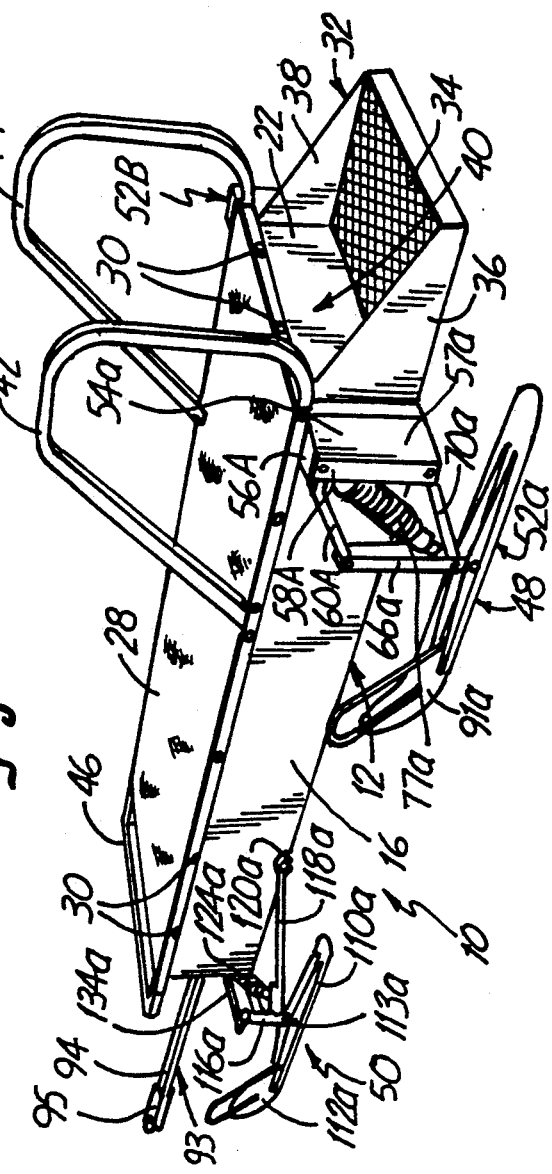
FIG. 1 is a rear perspective view of a towable rescue sled in accordance with the present invention with a cover secured over a patient/material carrying section.
Figure 2:
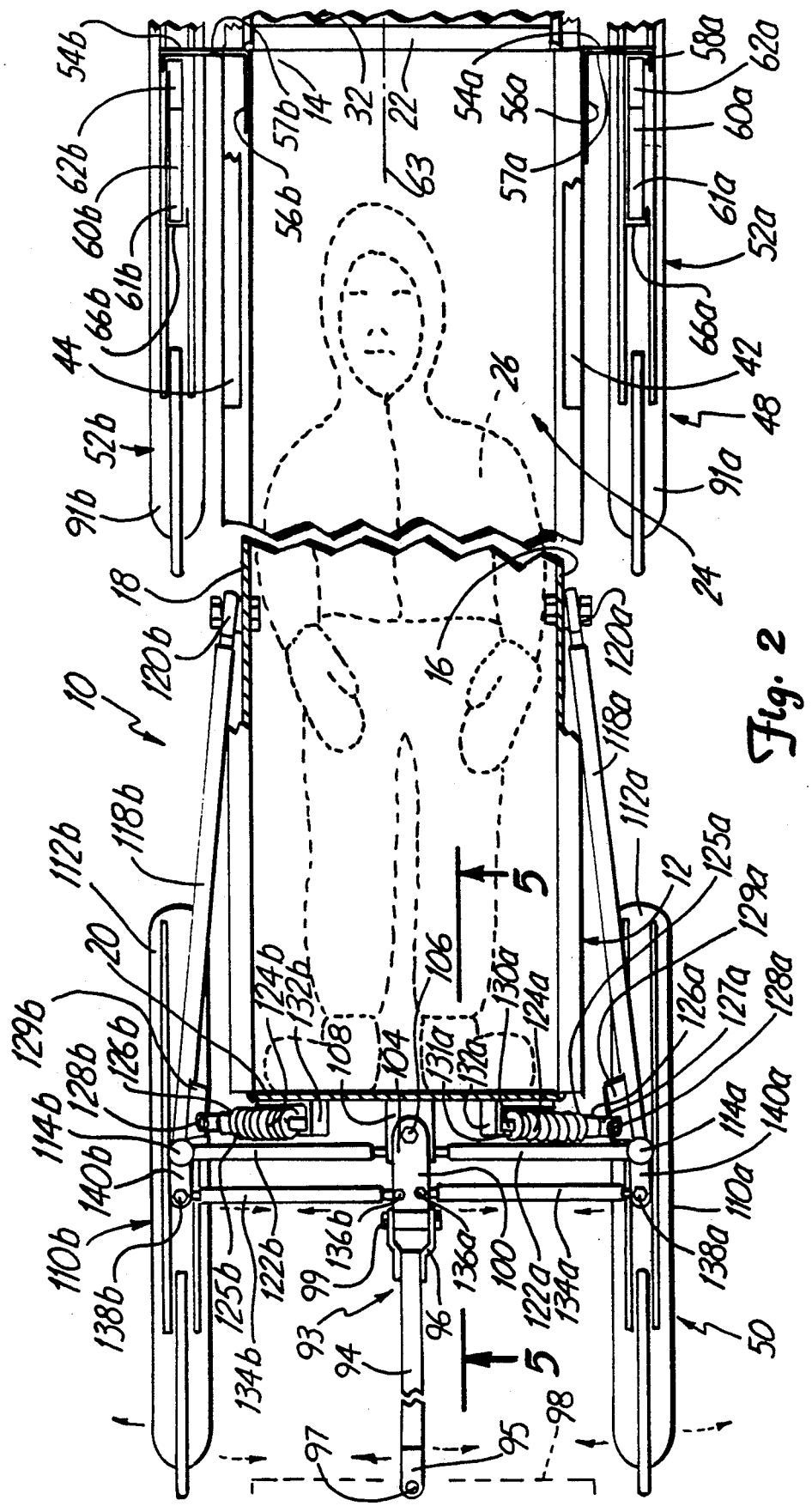
FIG. 2 is a top elevational view with parts shown in section of the rescue sled of FIG. 1 with the cover removed and a patient, shown in dashed lines, supported within the patient/material carrying section.

A rescue sled 10 in accordance with the present invention is illustrated generally in FIGS. 1 and 2. The rescue sled 10 includes a main support frame 12 including a base member 14, first and second side walls 16 and 18, respectively, a front end wall 20 and a rear end wall 22. As seen best in FIG. 2, the main support frame 12 defines a patient/material carrying section 24 of the rescue sled 10. As shown, the rescue sled 10 is primarily designed to transport an injured person 26 from a remote, snow covered accident/crash sight to a location where the injured person 26 can receive medical care or be further transported by conventional means to a medical facility. However, the rescue sled 10 can also be used to simply carry materials, equipment and/or personnel to and from the accident/crash sight or merely to transport materials, equipment and/or personnel to and from non-accident/crash sight locations.

As seen in FIG. 1 the patient/material carrying section 24 can be selectively enclosed by a cover member 28 that is removably secured to the first and second side walls 16 and 18 and the front and rear end walls 20 and 22 by snap fasteners 30. The rescue sled 10 further includes an auxiliary support frame 32 rigidly secured to the rear end wall 22. The auxiliary support frame 32 includes a base element 34 and first and second side elements 36 and 38, respectively. The auxiliary support frame 32 defines an attendant support section 40 of the rescue sled 10 upon which medical or like personnel can ride to attend to the injured person 26 during transport.

Mounted on main support frame 12 adjacent the auxiliary support frame 32 are first and second handrails 42 and 44, respectively, that can be grasped by an attendant while riding on the attendant support section 40 during transport of the injured person 26. The rescue sled 10 further includes a front handrail 46 rigidly mounted to the main support frame 12 adjacent the front end wall 20. The front handrail 46 and the first and second hand rails 42 and 44, among other uses, can be used to maneuver the rescue sled 10 when the sled 10 is not being used to transport a patient, equipment and/or materials.

As seen in FIG. 1, the rescue sled 10 is supported for travel over rugged, snow covered terrain by a rear suspension assembly 48 and a front suspension/steering assembly 50. The rear suspension assembly 48 includes a left and right, rear independent suspension units 52a and 52b, respectively. The left and right rear suspension units 52a and 52b are mirror images of one another, so only the left rear suspension unit 52a as best shown in FIGS. 1 and 3 will be described with particularity.

Left rear suspension unit 52a includes a U-shaped support bracket 54a having a first leg 56a rigidly secured to the first side wall 16, a bight portion 57a and a second leg 58a that extends substantially parallel to the first leg 56a and the first side wall 16. The suspension unit 52a further includes an upper suspension arm 60a having a first long segment 61a and a second short segment 62a which is disposed at an obtuse angle relative to the first segment 61a. The upper suspension arm 60a is pivotally mounted adjacent an upper edge of the second leg 58a of the support bracket 54a by way of a first pivot member 64a that pivotally engages a free end of the second segment 62a. A free end of the first segment 61a of the upper suspension arm 60a is pivotally coupled to a first end 65a of a strut member 66a by way of a second pivot member 68a.

Figure 3:
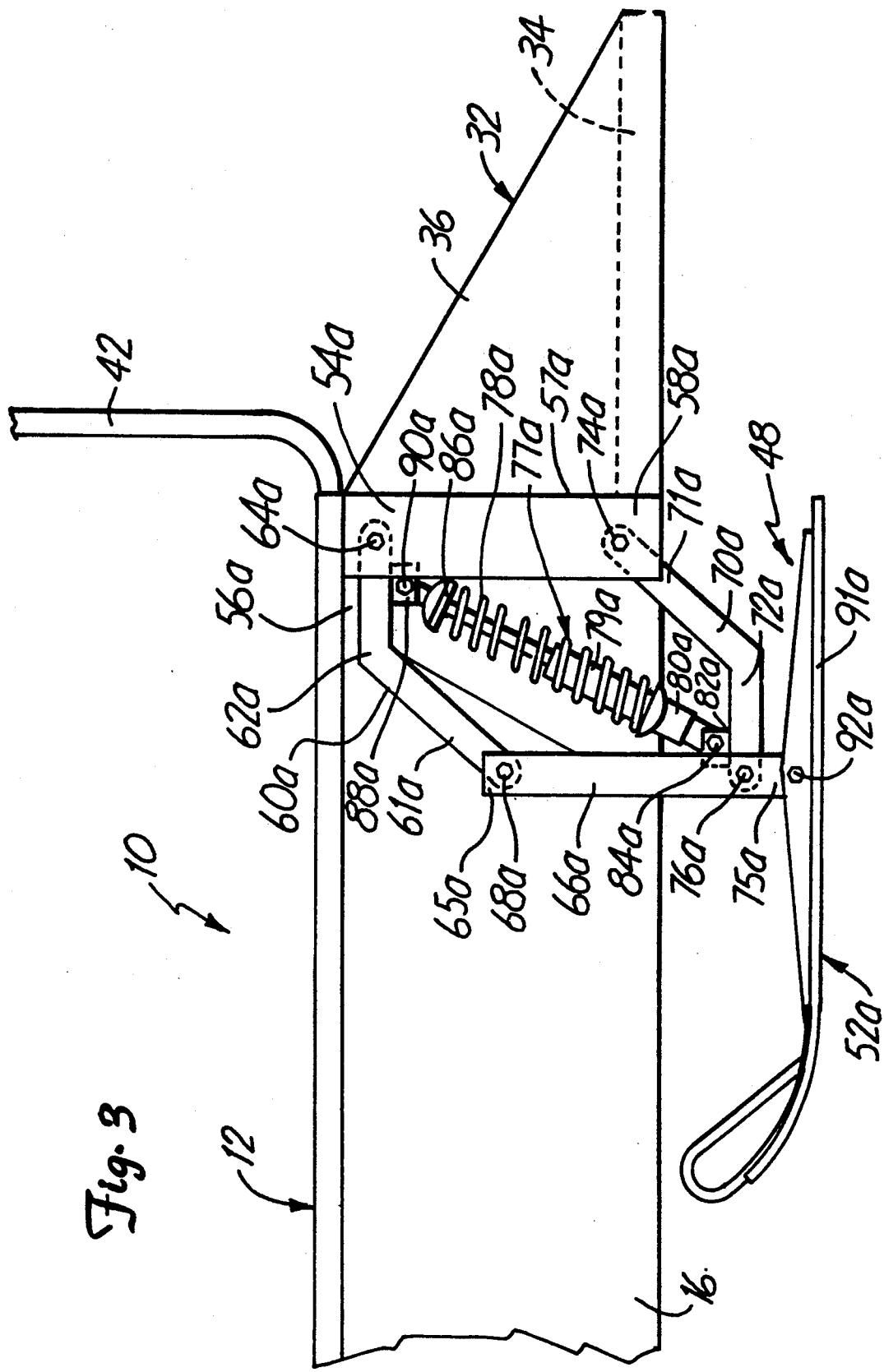
FIG. 3 is a partial side elevational view of a left rear suspension unit of the rescue sled shown in FIG. 1.

As seen best in FIG. 3, the left rear suspension unit 52a further includes a lower suspension arm 70a. The lower suspension arm 70a includes a first long segment 71a and a second short segment 72a which is disposed at an obtuse angle relative to the first segment 71a. The lower suspension arm 70a is pivotally mounted adjacent a lower edge of the second leg 58a of the support bracket 54a by way of a third pivot member 74a that pivotally engages a free end of the first segment 71a. A free end of the second segment 72a of the lower suspension arm 70a is pivotally coupled adjacent a second end 75a of the strut member 66a by way of a fourth pivot member 76a. The upper and lower suspension arms 60a and 70a extend toward the front end wall 20 and are parallel to a longitudinal centerline 63 of the rescue sled 10.

The suspension unit 52a further includes a coil over shock absorber member 77a defined by a spring coil element 78a that surrounds a fluid filled dampening unit 79a. A cylinder end 80a of the dampening unit 79a is pivotally coupled to a mounting bracket 82a rigid with the second segment 72a by way of first pivot element 84a. A piston end 86a of the dampening unit 79a is pivotally coupled to a mounting bracket 88a rigid with the second segment 62a by way of second pivot element 90a. As seen best in FIG. 3, a ski member 91a is pivotally mounted to the second end 75a of the strut member 66a by way of a third pivot element 92a.

As seen best in FIGS. 2 and 5, the front steering/suspension assembly 50 has a steering mechanism 93. The steering mechanism 93 includes a tow bar 94 having a first end 95 and a second end 96. The first end 95 is pivotally attached at 97 to a traction vehicle, such as a snowmobile 98, for movement about a vertical axis. The second end 96 of the tow bar 94 is pivotally attached at 99 to a first end 100 of a steering member 102 of the steering/suspension assembly 50 for movement about a horizontal axis. A second end 104 of the steering member 102 is pivotally attached at 106 to a mounting bracket 108 rigidly secured to the front end wall 20 for movement about a vertical axis. The steering/suspension assembly 50 further includes left and right, front independent suspension units 110a and 110b, respectively. The left and right front suspension units 110a and 110b are mirror images of one another, so only the left front suspension unit 110a as particularity.

Left front suspension unit 110a includes a ski member 112a pivotally mounted at 113a to a post 114a. The post 114a rotates within a strut element 116a. The strut element 116a includes a rigid trailing arm 118a which is pivotally mounted at 120a to the first side wall 16 of the main support frame 12. The strut element 116a further includes a rigid front arm 122a pivotally mounted at 123a to the mounting bracket 108 (see FIG. 5). The left suspension unit 110a further includes a coil over shock absorber 124a defined by a spring coil element 125a that surrounds a fluid filled dampening unit 126a. A cylinder end 127a of the dampening unit 126a is pivotally attached at 128a to a rigid bracket 129a of the trailing arm 118a. A piston end 130a of the dampening unit 126a is pivotally attached at 131a to a mounting bracket 132a rigid with the front end wall 20 of the main support frame 12. A steering rod 134a is attached for swivel movement at 136a to the steering member 100 and is further attached for swivel movement at 138a to a rigid extension 140a of the post 114a. The front ski members 112a,b are turned for steering purposes through the steering rods 134a,b upon pivoting of the tow bar 94 and steering member 102 about 106. Movement of the first end 95 of the tow bar 94 (caused by turning of the snowmobile 98) to the left causes the ski members 112a,b to turn to the left, likewise movement of the first end 95 of the tow bar 94 to the right causes the ski members 112a,b to turn to the right.

Figure 6:
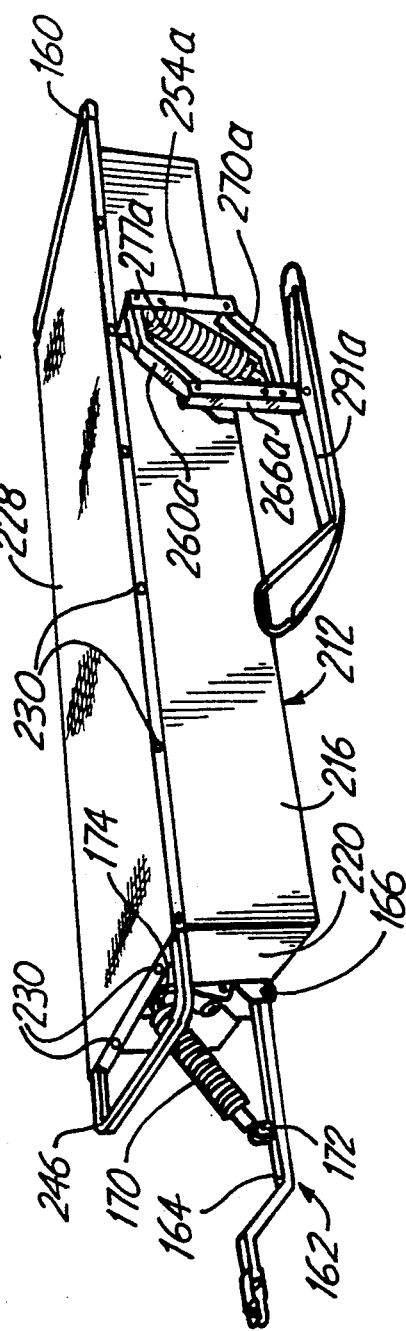
FIG. 6 is a front perspective view of another embodiment of a towable rescue sled in accordance with the present invention with a cover secured over a patient/material carrying section.

FIG. 6 illustrates an alternative rescue sled embodiment 210. Like parts are labeled with like numerals except for the addition of the prescript 2. In the rescue sled 210 the auxiliary support frame 32 and rear handrails 42 and 44 have been eliminated and replaced with a rear handrail 160 similar to handrail 246. In addition, the rear suspension assembly 48 has been moved closer to the center of gravity of the main support frame 212. The front suspension/steering assembly 50 has been eliminated and replaced with steering assembly 162. The steering assembly includes a tow bar 164 pivotally attached at 166 to a bracket 168 on front end wall 220. A spring coil over shock absorber member 170 is pivotally attached at 172 to the tow bar 164 and at 174 to the bracket 168.

The rescue sled 10 is relatively uncomplicated. The front and rear, left and right independent suspension units 110a,b and 52a,b, which incorporate spring coil over shock absorber units 124a,b and 77a,b, are ideally suited to traverse rugged snow covered terrain. Mounting the front and rear suspension units 110a,b and 52a,b flush with side walls 16 and 18 of the main support frame 12, lowers the center of gravity of the sled 10, allowing the sled 10 to be pulled at high speeds (i.e., in the 50 mph to 75 mph range) while providing a smooth, controllable and comfortable ride for an injured person 26. In addition, the flush mounting arrangement of the suspension units 110a,b and 52a,b allows the rear ski members 91a,b to be closer to the front ski members 112a,b, which greatly reduces the bridging effect (i.e., the bottom of the sled getting hung up on moguls and bumps) normally associated with rescue sleds. Moreover, the steering mechanism 93 allows the front ski members 112a,b, and thereby the rescue sled 10, to track with the snowmobile 98 in turns with minimal adverse affect to the rideability and steerability of the snowmobile 98.

Although the present invention has been described with reference to preferred embodiments, workers skilled in the art will recognize that changes may be made in form and detail without departing from the spirit and scope of the invention.

What is claimed is:

1. A vehicle adapted to be transported by a powered unit, the vehicle comprising;
a main support frame; and
a suspension assembly mounted to the main support frame, the suspension assembly including:
first and second independent suspension units, with each suspension unit including:
a support member;
means mounted to the support member to permit the vehicle to travel across a surface;
a first, relatively inflexible, suspension arm having a first end pivotally connected to the main support frame and a second end pivotally connected to the support member, a plane defined by a longitudinal extent of the first suspension arm extending substantially parallel to a plane defined by a longitudinal centerline of the vehicle;
a second, relatively inflexible, suspension arm having a first end pivotally connected to the main support frame and a second end pivotally connected to the support member, a plane defined by a longitudinal extent of the second suspension arm extending substantially parallel to the plane defined by the longitudinal centerline of the vehicle; and
a shock absorbing means having a first end pivotally coupled to the first suspension arm and a second end pivotally coupled to the second suspension arm.

2. The vehicle of claim 1 wherein the first end of the shock absorbing means is pivotally coupled to the first suspension arm immediately adjacent the pivotal connection of the first suspension arm with the main support frame, and wherein the second end of the shock absorbing means is pivotally coupled to the second suspension arm immediately adjacent the pivotal connection of the second suspension arm with the support member.

3. The vehicle of claim 2 wherein the shock absorbing means is a spring coil over shock absorber unit.

4. The vehicle of claim wherein the means mounted to the support member to permit the vehicle to travel across a surface is a ski member.

5. The vehicle of claim 1 wherein the suspension assembly further includes:
third and fourth independent suspension units, with each suspension unit including:
a support element;
means mounted to the support element to permit the vehicle to travel across a surface;
a shock absorbing means having a first end pivotally coupled to the main support frame and a second end pivotally coupled to the support element.

6. The vehicle of claim 5 wherein each of the third and fourth suspension units further includes:
a trailing suspension arm having a first end rigidly secured to the support element and a second end pivotally coupled to a side wall of the main support frame.

7. The vehicle of claim 6 wherein each of the third and fourth suspension units further includes:
a front suspension arm having a first end rigidly secured to the support element and a second end pivotally coupled to a front end wall of the main support frame.

8. The vehicle of claim 5 wherein the shock absorbing means is a spring coil over shock absorber unit.

9. The vehicle of claim 5, and further including:
a tow bar pivotally mounted to the main support frame.

10. The vehicle of claim 9, and further including:
a shock absorbing means having a first end pivotally coupled to the tow bar and a second end pivotally coupled to the main support frame.

11. The vehicle of claim 9 wherein the means mounted to the support member to permit the vehicle to travel across a surface is a steerable ski member.

12. A rescue sled adapted to be pulled by a snowmobile, the rescue sled comprising:
a main support frame including a base member, first and second side walls and front and rear end walls;
and auxiliary support frame mounted to the rear end wall of the main support frame; and
a suspension assembly mounted to the main support frame, the suspension assembly including;

first and second independent suspension units, with each suspension unit including:

a strut member;

a ski member mounted to the strut member to permit the vehicle to travel across a snow covered surface;

a first, relatively inflexible, suspension arm having a first end pivotally connected to the main support frame and a second end pivotally connected to the strut member, a plane defined by a longitudinal extent of the first suspension arm extending substantially parallel to a plane defined by a longitudinal centerline of the vehicle;

a second, relatively inflexible, suspension arm having a first end pivotally connected to the main support frame and a second end pivotally connected to the strut member, a plane defined by a longitudinal extent of the second suspension arm extending substantially parallel to the plane defined by the longitudinal centerline of the vehicle; and a shock absorbing means having a first end pivotally coupled to the first suspension arm and a second end pivotally coupled to the second suspension arm.

* * * * *

UNITED STATES PATENT AND TRADEMARK OFFICE
CERTIFICATE OF CORRECTION

PATENT NO. : 5,242,176

DATED : September 7, 1993

INVENTOR(S) : DEAN HENDRICKSON

It is certified that error appears in the above-identified patent and that said Letters Patent is hereby corrected as shown below:

Col. 6, line 27, delete "claim", insert --claim 1--

Signed and Sealed this

Twelfth Day of April, 1994

*Attest:*

BRUCE LEHMAN

*Attesting Officer*  *Commissioner of Patents and Trademarks*